(12) United States Patent
Park

(10) Patent No.: US 8,189,673 B2
(45) Date of Patent: May 29, 2012

(54) METHOD OF AND APPARATUS FOR PREDICTING DC COEFFICIENT OF VIDEO DATA UNIT

(75) Inventor: Gwang-hoon Park, Seongnam-si (KR)

(73) Assignees: Industry Academic Cooperation Foundation Kyungee University, Youngin-Si (KR); Samsung Electronics Co., Ltd., Suwon-Si (KR)

( * ) Notice: Subject to any disclaimer, the term of this patent is extended or adjusted under 35 U.S.C. 154(b) by 1571 days.

(21) Appl. No.: 11/079,219

(22) Filed: Mar. 15, 2005

(65) Prior Publication Data

US 2005/0276333 A1 Dec. 15, 2005

(30) Foreign Application Priority Data

Jun. 11, 2004 (KR) ........................ 10-2004-0042909

(51) Int. Cl.
*H04N 7/12* (2006.01)
*H04N 11/02* (2006.01)
*H04N 11/04* (2006.01)

(52) U.S. Cl. ................................. 375/240.18

(58) Field of Classification Search .............. 375/240.18
See application file for complete search history.

(56) References Cited

U.S. PATENT DOCUMENTS 6,148,109 A 11/2000 Boon et al.
7,010,044 B2 * 3/2006 Dattani et al. ........... 375/240.24

2004/0066854 A1 * 4/2004 Hannuksela ............. 375/240.27

FOREIGN PATENT DOCUMENTS

KR 10-0324608 B1 4/2002

OTHER PUBLICATIONS

Wang, Ye-Kui;Hannuksela, Miska M. ; and Gabbouj Monce; "Error-Robust Inter/Intra Macroblock Mode selection using Isolated Regions" Apr. 9, 2003; UC Berkely video and Image Processing Lab; available at http://www-video.eecs.berkeley.edu/Proceedings/PacketVideo2003/pv/papers/cr1018.pdf.*

(Continued)

*Primary Examiner* — Mehrdad Dastouri
*Assistant Examiner* — Jeremaiah Hallenbeck-Huber
(74) *Attorney, Agent, or Firm* — Sughrue Mion, PLLC

(57) ABSTRACT

A method of and an apparatus are provided for predicting a DC coefficient of video data. In the method, at least one reference data unit for prediction of a DC coefficient of a current data unit is selected from at least one previous data unit that is scanned according to region of interest-oriented scanning and then transformed before the current data unit. In the region of interest-oriented scanning, scanning starts with a data unit located in a predetermined location of a region of interest and continues in the form of a plurality of square rings in which the remaining data units included in the region of interest surround the data unit located in the predetermined location of the region of interest. Thereafter, a predicted value of the DC coefficient of the current data unit is determined using a DC coefficient of the at least one reference data unit.

17 Claims, 12 Drawing Sheets

OTHER PUBLICATIONS

Wang, Ye-Kui; Hannuksela, Miska M.; and Gabbouj Monce; "Error-Robust Inter/Intra Macroblock Mode selection using Isolated Regions" Apr. 29, 2003; UC Berkely video and Image Processing Lab; available at http://www.cs.tut.fi/~moncef/publications/error-robust-pv2003.pdf bibliographic data available at http://www.cs.tut.fi/~moncef/publications.htm.*

H.26L Test Model Long-Term No. 9 (TML-9) Draft; Dec. 21, 2001; ITU—Telecommunications Standardization Sector; pp. 11-14.*
14496-2, Information technology—Coding of audio-visual objects—Part: 2 Visual; ISO/IEC; Dec. 1, 200; 2nd Edition; pp. 169-171.*
Korean Decision of Grant, dated Aug. 19, 2010, issued in Application No. 10-2004-0042909.

* cited by examiner

FIG. 4 (PRIOR ART)

| 5 | 5 | 5 | 5 | 5 | 5 | 5 | 5 | 5 |
|---|---|---|---|---|---|---|---|---|
| 4 | 4 | 4 | 4 | 4 | 4 | 4 | 4 | 4 |
| 4 | 3 | 3 | 3 | 3 | 3 | 3 | 3 | 4 |
| 4 | 3 | 2 | 2 | 2 | 2 | 2 | 3 | 4 |
| 4 | 3 | 2 | 1 | 1 | 1 | 2 | 3 | 4 |
| 4 | 3 | 2 | 1 | 0 | 1 | 2 | 3 | 4 |
| 4 | 3 | 2 | 1 | 1 | 1 | 2 | 3 | 4 |
| 4 | 3 | 2 | 2 | 2 | 2 | 2 | 3 | 4 |
| 4 | 3 | 3 | 3 | 3 | 3 | 3 | 3 | 4 |
| 4 | 4 | 4 | 4 | 4 | 4 | 4 | 4 | 4 |
| 5 | 5 | 5 | 5 | 5 | 5 | 5 | 5 | 5 |

- FIRST WATER RING (11)
- SECOND WATER RING (13)
- THIRD WATER RING (15)
- FOURTH WATER RING (17)
- FIFTH WATER RING (19)

FIG. 6A (PRIOR ART)

| C30 | C31 | C32 | C33 | C34 | C35 | C36 |
|---|---|---|---|---|---|---|
| C29 | C12 | C13 | C14 | C15 | C16 | C37 |
| C28 | C11 | C2 | C3 | C4 | C17 | C38 |
| C27 | C10 | C1 | O | C5 | C18 | C39 |
| C26 | C9 | C8 | C7 | C6 | C19 | C40 |
| C25 | C24 | C23 | C22 | C21 | C20 | C41 |
| C48 | C47 | C46 | C45 | C44 | C43 | C42 |

FIG. 6B (PRIOR ART)

| C36 | C35 | C34 | C33 | C32 | C31 | C30 |
|---|---|---|---|---|---|---|
| C37 | C16 | C15 | C14 | C13 | C12 | C29 |
| C38 | C17 | C4 | C3 | C2 | C11 | C28 |
| C39 | C18 | C5 | O | C1 | C10 | C27 |
| C40 | C19 | C6 | C7 | C8 | C9 | C26 |
| C41 | C20 | C21 | C22 | C23 | C24 | C25 |
| C42 | C43 | C44 | C45 | C46 | C47 | C48 |

METHOD OF AND APPARATUS FOR PREDICTING DC COEFFICIENT OF VIDEO DATA UNIT

This application claims priority from Korean Patent Application No. 10-2004-0042909, filed on Jun. 11, 2004 in the Korean Intellectual Property Office, the disclosure of which is incorporated herein in its entirety by reference.

BACKGROUND OF THE INVENTION

1. Field of the Invention

The present invention relates to predictive encoding of video data, and more particularly, to a method of and an apparatus for predicting a direct current (DC) coefficient of a video data unit.

2. Description of the Related Art

Since video data contains a large amount of data, compression encoding is essential for storage or transmission of video data. Encoding or decoding of video data is performed in data units such as macroblocks of 16×16 pixels or blocks of 8×8 pixels. For encoding or decoding of video data in predetermined data units, data units included in one picture should be scanned.

FIG. 1 is a view for explaining conventional raster scan. Raster scan is carried out in such a way that data units included in a picture are scanned left-to-right and up-to-down. Raster scan begins with a data unit at the top left corner of the picture.

As one of video data compression methods, there is intra spatial predictive encoding. Intra spatial predictive encoding is a technique for compressing video data using similarities among data in one picture. More specifically, after a pixel value of a current data unit to be encoded is predicted using at least one pixel value of at least one previous data unit that has a correlation with the current data unit, a difference between an actual pixel value of the current data unit and the predicted pixel value of the current data unit is entropy coded and then transmitted. Through intra spatial predictive encoding, the efficiency of data compression can be improved when the actual pixel value is entropy coded and then transmitted.

FIG. 2 shows an example of previous data units used for intra spatial predictive encoding of a current data unit according to prior art. Referring to FIG. 2, previous data units A, B, C, and D are used for intra spatial predictive encoding of a current data unit E. According to conventional raster scan, data units included in one picture are scanned left-to-right and up-to-down. Thus, according to conventional scan, the data units A, B, C, and D are already scanned and encoded prior to the current data unit E. Since data units marked with X are not encoded prior to the current data unit E, they cannot be used for predictive encoding of the current data unit E. Since data units marked with O usually have low correlations with the current data unit E, they are not used for predictive encoding of the current data unit E. Previous data units are already encoded or already encoded and then restored through decoding.

Intra predictive encoding employed in MPEG-4 Part 2 uses a discrete cosine transform (DCT) coefficient. As shown in FIG. 2, if the data unit E is a current data unit to be intra spatial predictive encoded, according to MPEG-4 Part 2, the previous data units A, B, and D are used for intra spatial predictive encoding of the current data unit E. The previous data units A, B, and D and the current data units E are macroblocks of a 16×16 size.

In the case of MPEG-4 Part 2, a DC coefficient of the current data unit E is predicted in an area that is DCT transformed in 8×8 block units, using differences among DC coefficients of the previous data units A, B, and D.

FIG. 3 is a view for explaining intra predictive encoding in MPEG-4 Part 2. Referring to FIG. 3, the previous data units A, B, and D and the current data unit E that are macroblocks of a 16×16 size are predictive encoded in units of a 8×8 block. In other words, the previous data unit A is divided into $A_1$ through $A_4$, the previous data unit B is divided into $B_1$ through $B_4$, the previous data unit D is divided into $D_1$ through $D_4$, and the current data unit E is divided into $E_1$ through $E_4$.

Intra prediction of the current data unit E is performed as follows. First, to perform intra prediction of the current data unit E, it is determined whether the previous data units A, B, and D exist. If one of the previous data units A, B, and D is located in a different video object plane (VOP), a predicted value of a DC coefficient of the current data unit E is determined to be, for example, 128. A VOP is a kind of video unit for video coding and, according to MPEG-4 Part 2, one image frame is divided into a plurality of VOPs and is encoded or decoded in units of a VOP.

If the previous data units A, B, and D and the current data unit E are all located in the same VOP, it is determined whether blocks $D_4$, $B_3$, and $A_2$ exist for processing a block $E_1$ among four 8×8 blocks included in the current data unit E. In cases where any one of the blocks $D_4$, $B_3$, and $A_2$ does not exist or is not intra coded, a predicted value of the DC coefficient of the block $E_1$ is determined to be 128.

Thereafter, in another cases except for the above two cases, an intra predicted value of the DC coefficient of the block $E_1$ is determined as follows. In other words, when a difference between a DC coefficient of the block $A_2$ and a DC coefficient of the block $D_4$ is less than a difference between a DC coefficient of the block D4 and a DC coefficient of the block $B_3$, there is a high probability that the DC coefficient of the block $E_1$ is similar to the DC coefficient of the block $B_3$. Thus, the predicted value of the DC coefficient of the block $E_1$ is determined to be the DC coefficient of the block $B_3$. In the contrary case, the predicted value of the DC coefficient of the block $E_1$ is determined to be the DC coefficient of the block $A_2$.

Since the prediction method described above can be performed in the same manner in an encoder and a decoder, it has the advantage of not requiring the encoder to transmit a parameter for a predicted value of a DC coefficient. In other words, also in the decoder, a predicted value of a DC coefficient can be obtained in the same manner as in the encoder.

The above-described procedure is repeated for prediction of a DC coefficient of a block $E_2$ using the blocks $E_1$, $B_3$, and $B_4$, for prediction of a DC coefficient of a block $E_3$ using the blocks $A_2$, $A_4$, and $E_1$, and for prediction of a DC coefficient of a block $E_4$ using the blocks $E_1$, $E_2$, and $E_3$.

A new video data scan scheme that is different from the above-described raster scan has been developed. Korean Patent Publication No. 2002-5365 titled "Apparatus and Method for Water Ring Scan and Apparatus and Method for Video Coding/Decoding Using the Same" discloses a scan method called a water ring scan method.

FIG. 4 shows a water ring scan method. A picture shown in FIG. 4 includes a plurality of data units. The water ring scan method starts from a predetermined location of a picture, e.g., a data unit in the center of the picture, towards data units surrounding the scanned data unit, with clockwise or counterclockwise rotation. When data units are scanned according to the water ring scan method, scanning takes a form of water rings in which a plurality of water rings surrounds a data unit as a water ring origin point.

Referring to FIG. 4, the data unit as the water ring origin point is indicated by 0 and a plurality of water rings surrounds the data unit indicated by 0. Data units forming a first water ring 11 are indicated by 1, data units forming a second water ring 13 are indicated by 2, and data units forming a third water ring 15, a fourth water ring 17, and a fifth water ring 19 are indicated by numbers, respectively, in the same manner. Each water ring takes the form of a square ring.

A recently established new video compression coding standard MPEG-4 Part 10 AVC (advanced video coding) or ITU-T H.264 was developed to deal with transition from conventional circuit switching to packet switching service and various communication infrastructures, as new communication channels such as mobile communication networks are rapidly distributed. AVC/H.264 improves the encoding efficiency by 50% or more in comparison to existing standards MPEG-4 Part 2 visual codec and considers error robustness and network friendliness to cope with the rapidly changing wireless environment and Internet environment.

In particular, to actively respond to a transmission error in a wireless transmission environment or a packet-based transmission environment like Internet, MPEG-4 Part 10 AVC newly employs video data scan called flexible macroblock ordering (FMO). In FMO, there are seven modes and three modes among them are called box-out scanning. Box-out scanning is an example of the water ring scan method described above. In the case of box-out scanning, a picture is divided into a region of user's interest and a background region and the two regions are encoded and decoded in different manners.

FIG. 5 shows a picture that is divided into a region of interest (ROI) 21 and a left-over region 23. In one picture, a region of interest is generally a region around the center of the picture. Thus, a region within a predetermined range from the center of the picture is determined to be the ROI 21 and the remaining region is determined to be the left-over region 23. To encode and decode the ROI 21 independently of the left-over region 23, the left-over region 23 cannot be used for spatial predictive coding of the ROI 21.

FIG. 6A shows box-out scanning in which data units are scanned clockwise, and FIG. 6B shows box-out scanning in which data units are scanned counterclockwise.

Box-out scanning is one of methodologies for encoding an ROI and improves the compression efficiency considering human visual characteristics or enables improved protection from errors. More specifically, during encoding, box-out scanning can offer better protection from errors to an ROI than a left-over region. Since encoding of an ROI is independent of encoding of a left-over region, data of the left-over region can be encoded by reducing its bitrate and computational complexity. In particular, when a gradual random access is performed, a ROI can be only reconstructed in a decoder and an encoder can only transmit an ROI to the decoder.

When a method of scanning data units from the center of a picture towards the remaining region of the picture like the above-described water ring scanning or box-out scanning is called ROI-oriented scanning, conventional intra spatial predictive encoding cannot be applied to video data that is scanned according to ROI-oriented scanning and then encoded or decoded.

FIG. 7 shows reference data units required for prediction of a DC coefficient of a current data unit according to a conventional prediction method when data units are scanned according to clockwise box-out scanning as shown in FIG. 6A. When a data unit C1 is the current data unit to be intra-predicted, previous data units C2, C10, and C11 are required for intra-prediction of the current data unit C1 according to a conventional prediction method.

However, when data units are scanned according to clockwise box-out scanning, since the data units C2, C10, and C11 are to be scanned and encoded after the current data unit C1, they cannot be used for intra-prediction of the current data unit C1.

In other words, when video data is scanned according to ROI-oriented scanning and then encoded, a DC coefficient of a current data unit cannot be predicted based on conventional raster scanning.

SUMMARY OF THE INVENTION

The present invention provides a method of and an apparatus for predicting a DC coefficient of video data, which are suitable for ROI-oriented scan.

According to one aspect of the present invention, there is provided a method of predicting a direct current (DC) coefficient of a video data unit, the method comprising selecting at least one reference data unit for prediction of a DC coefficient of a current data unit from at least one previous data unit that is scanned according to region of interest-oriented scanning and then transformed before the current data unit, wherein in the region of interest-oriented scanning, scanning starts with a data unit located in a predetermined location of a region of interest and continues in the form of a plurality of square rings in which the remaining data units included in the region of interest surround the data unit located in the predetermined location of the region of interest; and determining a predicted value of the DC coefficient of the current data unit using a DC coefficient of the at least one reference data unit.

According to another aspect of the present invention, there is provided an apparatus for predicting a direct current (DC) coefficient of a video data unit, the apparatus comprising a memory which stores a transform coefficient of at least one previous data unit that is scanned according to region of interest-oriented scanning and then transformed before the current data unit, wherein in the region of interest-oriented scanning, scanning starts with a data unit located in a predetermined location of a region of interest and continues in the form of a plurality of square rings in which the remaining data units included in the region of interest surround the data unit located in the predetermined location of the region of interest; a reference data unit selection unit which selects at least one reference data unit for prediction of a DC coefficient of the current data unit from among the at least one previous data unit; and a prediction unit which receives an index indicating the selected at least one reference data unit from the reference data unit selection unit, which reads a DC coefficient of the selected at least one reference data unit from the memory, and determines a predicted value of the DC coefficient of the current data unit using the read DC coefficient of the at least one reference data unit.

BRIEF DESCRIPTION OF THE DRAWINGS

The above and other aspects of the present invention will become more apparent by describing in detail exemplary embodiments thereof with reference to the attached drawings in which:

FIG. 4 shows a water ring scan method according to prior art;

FIG. 6A shows box-out scanning in which data units are scanned clockwise;

FIG. 6B shows box-out scanning in which data units are scanned counterclockwise;

DETAILED DESCRIPTION OF EXEMPLARY EMBODIMENTS OF THE INVENTION

In the present invention, scanning of data units from the center of a picture towards a left-over region, such as water ring scan or box-out scan described above, is called ROI-oriented scan. Each of the data units is a macroblock, a block, a pixel, or a group of a predetermined number of pixels.

Predictive encoding of video data is a technique that uses a result of encoding data units that are adjacent to a current data unit for the purpose of encoding the current data unit. As examples of predictive encoding techniques, there are (1) prediction of a motion vector of a current data unit using motion vectors of data units that are adjacent to the current data unit; (2) prediction of a discrete cosine transform (DCT) coefficient of a current block using DCT coefficients of blocks that are adjacent to the current block; and (3) prediction of a value of a current pixel using values of pixels that are adjacent to the current pixel.

The present invention concerns, among the three types of prediction, prediction of a DCT coefficient of a current block using DCT coefficients of adjacent blocks. In particular, in an exemplary embodiment of the present invention to be described below, a method of and an apparatus for predicting a DC coefficient of a current block using DC coefficients of previous blocks of 8×8 are disclosed.

Figures 7, 8:
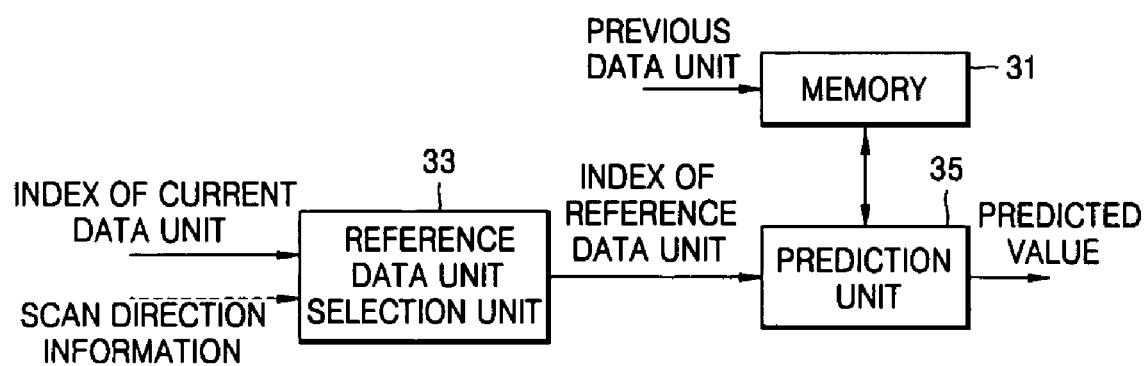
FIG. 7 shows reference data units required for prediction of a DC coefficient of a current data unit according to a conventional prediction method.
FIG. 8 is a block diagram of an apparatus for predicting a DC coefficient of video data according to an exemplary embodiment of the present invention.

FIG. 8 is a block diagram of an apparatus for predicting a DC coefficient of video data according to an exemplary embodiment of the present invention. Referring to FIG. 8, the apparatus includes a memory 31, a reference data unit selection unit 33, and a prediction unit 35.

The memory 31 stores DCT coefficients of previous data units that are scanned according to ROI-oriented scan and are then encoded prior to a current data unit. In this embodiment, the current data unit and the previous data units are macroblocks of 16×16, and DCT is performed in 8×8 block units.

The reference data unit selection unit 33 receives index information of the current data unit, selects at least one reference data unit for intra-prediction of a DC coefficient of the current data unit, and outputs index information of the selected reference data unit to the prediction unit 35. The reference data unit selection unit 33 can recognize the location of the current data unit in a current video region that is ROI-oriented scanned based on the index information of the current data unit.

Also, scan direction information may be further input to the reference data unit selection unit 33. In the case of box-out scan adopted in MPEG-4/H.264, scan begins with a data unit located in the center of a region in a clockwise or counterclockwise direction. Thus, the scan direction information indicating the direction of scan may be further input to the reference data unit selection unit 33.

The prediction unit 35 receives index information of at least one reference data unit from the reference data unit selection unit 33 and reads at least one DC coefficient of the at least one reference data unit required for intra-prediction of the DC coefficient of the current data unit from the memory 31. The prediction unit 35 determines a predicted value of the DC coefficient of the current data unit using the read DC coefficients of reference data units.

Based on the structure of the apparatus for predicting a DC coefficient shown in FIG. 8, a method of predicting a DC coefficient of a current video data unit according to the present invention will be described in detail.

Figure 9:
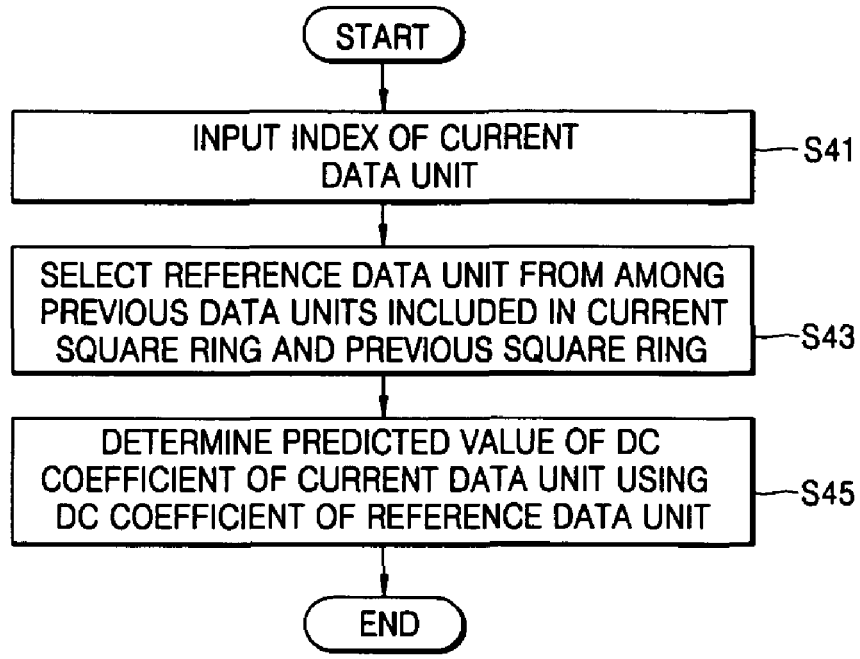
FIG. 9 is a flowchart illustrating a method of predicting a DC coefficient of video data according to an exemplary embodiment of the present invention.

FIG. 9 is a flowchart illustrating a method of predicting a DC coefficient of a current data unit according to an exemplary embodiment of the present invention.

Once index information of a current data unit is input to the reference data unit selection unit 33 in operation S41, the reference data unit selection unit 33 selects at least one reference data unit for prediction of a DC coefficient of the current data unit from among previous data units included in a current square ring and a previous square ring in operation S43.

The current square ring means a square ring including the current data unit and the previous square ring means a square ring that is immediately inwardly adjacent to the current square ring. For example, among data units shown in FIG. 6A, if the data unit C11 is the current data unit, the current square ring is a group composed of the data units C9 through C24 and the previous square ring is a group composed of the data units C1 through C8.

After receiving index information of at least one reference data unit from the reference data unit selection unit 33, the prediction unit 35 reads at least one DC coefficient of the at least reference data unit for intra-prediction of the DC coefficient of the current data unit from the memory 31. In operation S45, the prediction unit 35 determines a predicted value of the DC coefficient of the current data unit using the read DC coefficients of reference data units according to the present invention.

Figure 10:
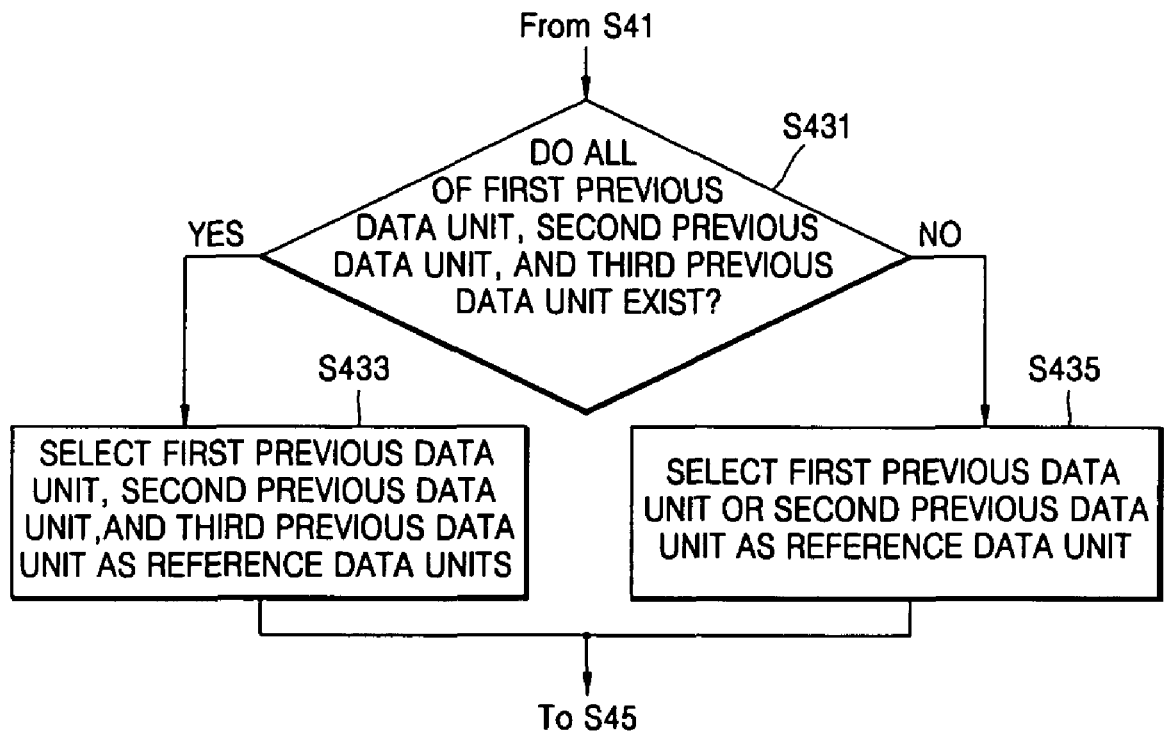
FIG. 10 is a detailed flowchart for explaining a procedure of selecting reference data units according to an exemplary embodiment of the present invention.

FIG. 10 is a detailed flowchart for explaining a procedure of selecting reference data units according to an exemplary embodiment of the present invention, in which step S43 shown in FIG. 9 is described in more detail.

First of all, a previous data unit that is included in the current square ring and is adjacent to the current data unit is defined as a first previous data unit, a previous data unit that is included in the previous square ring and is adjacent to the current data unit is defined as a second previous data unit, and a previous data unit that is adjacent to both the first previous data unit and the second previous data unit is defined as a third previous data unit.

In operation S431, the reference data unit selection unit 33 determines whether all of the first previous data unit, the second previous data unit, and the third previous data unit exist for selection of reference data units used for prediction of the DC coefficient of the current data unit.

In operation S433, if all of the first previous data unit, the second previous data unit, and the third previous data unit exist, the reference data unit selection unit 33 selects the first previous data unit, the second previous data unit, and the third previous data unit as reference data units.

However, if any one of the first previous data unit, the second previous data unit, and the third previous data unit does not exist, the reference data unit selection unit 33 selects one of the first previous data unit and the second previous data unit as a reference data unit in operation S435.

When data units are scanned according to ROI-oriented scanning, there may be three cases in which one previous data unit only exists, two previous data unit exist, or three previous data units exist, for predictive encoding of the current data unit. Hereinafter, selection of reference data units according to an embodiment of the present invention will be described for the three cases. Here, the current data unit and the previous data units are 16×16 macroblocks.

I. Case 1

In this case, there is only one previous macroblock for predictive encoding of a current macroblock. In other words, only one of the previous data unit, the second previous data unit, and the third previous data unit exists.

A case where a macroblock that is scanned after a macroblock as a scanning start point according to ROI-oriented scanning for encoding or decoding is a current macroblock corresponds to case 1. In case 1, one previous macroblock is selected as a reference macroblock for predictive encoding of the current macroblock. For example, if the macroblock C1 shown in FIG. 6A is the current macroblock, the macroblock O at the origin point is the reference macroblock.

II. Case 2

In this case, two previous macroblocks adjacent to the current macroblock exist for predictive encoding of the current macroblock. In case 2, two previous macroblocks include one previous macroblock that exists in a square ring that is inwardly adjacent to the current square ring and is adjacent to the current macroblock and one previous macroblock that is included in the current square ring, is already encoded or decoded before encoding or decoding of the current macroblock, and can be referred to.

When the current macroblock is a macroblock E, a macroblock that exists in the current square ring including the current macroblock E and is adjacent to the current macroblock E is defined as a macroblock A, and a macroblock that exists in a square ring that is inwardly adjacent to the current square ring including the current macroblock E and is adjacent to the current macroblock E is defined as a macroblock D. When the current macroblock E is divided into four 8×8 blocks $E_1$ through $E_4$, the macroblock A is divided into four 8×8 blocks $A_1$ through $A_4$, and the macroblock D is divided into four 8×8 blocks $D_1$ through $D_4$, there are four locations of the current macroblock and the previous macroblocks, as shown in FIGS. 12A through 12D.

As shown in FIGS. 12A through 12D, the macroblock D is located diagonally with respect to the current macroblock E at all times. Due to the characteristic of video data, a video correlation is higher in a horizontal or vertical direction than in a diagonal direction. Thus, since information of the macroblock D is not reliable at all times, information of the macroblock A is only reliable and the macroblock A is selected as a reference macroblock for intra-prediction of the current macroblock E. In other words, there exists only one of the first previous data unit, the second previous data unit, and the third previous data unit, or one of the first previous data unit and the second previous data unit exists and the third previous data unit exists.

III. Case 3

In this case, there are at least three previous macroblocks that are adjacent to the current macroblock for predictive encoding of the current macroblock. The at least three previous macroblocks include a macroblock that exists in the current square ring, is encoded or decoded immediately before encoding or decoding of the current macroblock, and can be referred to and at least two previous macroblocks that exist in a previous square ring that is inwardly adjacent to the current square ring and are adjacent to the current macroblock.

The current macroblock is defined as a macroblock E, the macroblock that exists in the current square ring including the current macroblock E and is adjacent to the current macroblock E is defined as a macroblock A, the macroblock that exists in a previous square ring that is inwardly adjacent to the current square ring and is adjacent to the current macroblock E is defined as a macroblock B, and the macroblock that is adjacent to both the macroblock A and the macroblock B and exists in the previous square ring that is inwardly adjacent to the current square ring is defined as a macroblock D. In other words, the macroblock A corresponds to the first previous data unit, the macroblock B corresponds to the second previous data unit, and the macroblock C corresponds to the third previous data unit.

In case 3, the three macroblocks A, B, and D are selected as reference macroblocks for predictive encoding of the current macroblock E.

When the current macroblock E is divided into four 8×8 blocks $E_A$ through $E_D$, the macroblock A is divided into four 8×8 blocks $A_A$ through $A_D$, the macroblock B is divided into four 8×8 blocks $B_A$ through $B_D$, and the macroblock D is divided into four 8×8 blocks $D_A$ through $D_D$, there are eight locations of the current macroblock and the previous macroblocks, as shown in FIGS. 13A through 13H.

Once reference macroblocks are selected as described above, the prediction unit 35 determines a predicted value of the DC coefficient of the current macroblock as follows, for each of case 1 through case 3.

I. Case 1

Figure 11A:
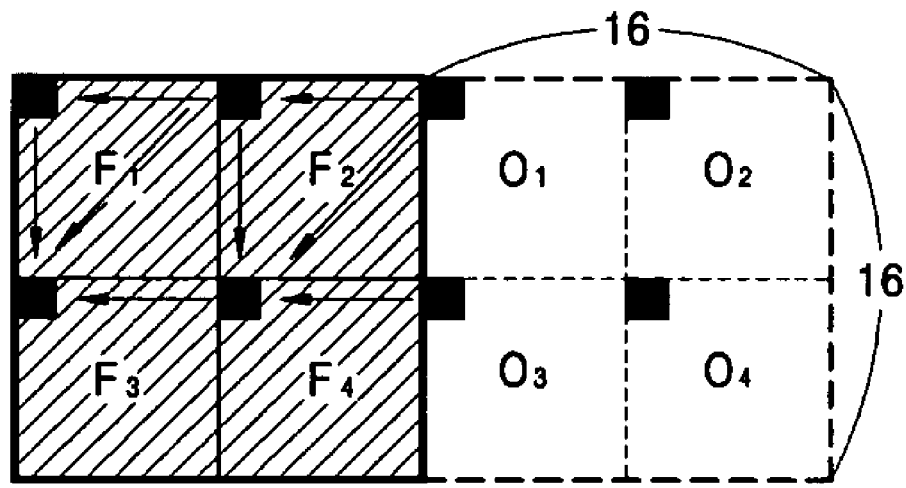
FIGS. 11A and 11B show a current macroblock and reference macroblocks according to an exemplary embodiment of the present invention.
Figure 11B:
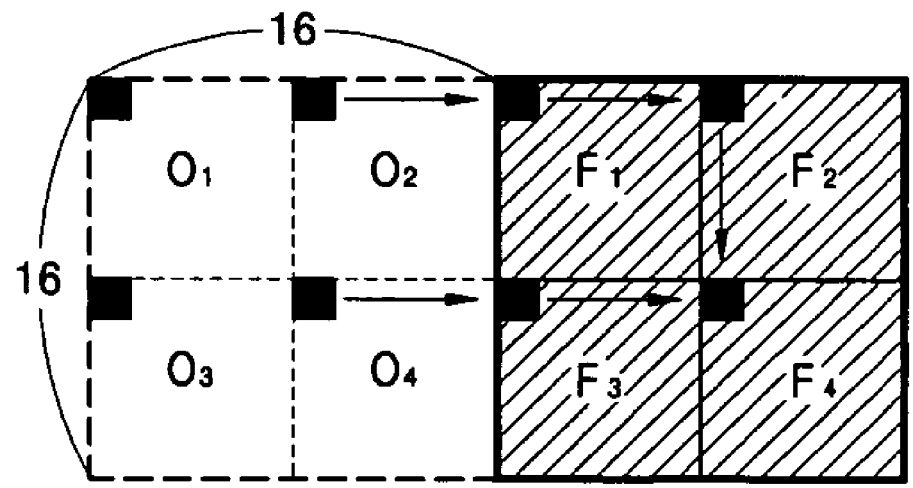

FIGS. 11A and 11B show a case where a reference macroblock is the macroblock at the origin point, in which the current macroblock and the reference macroblock that correspond to case 1 are shown. Referring to FIGS. 11A and 11B, the current macroblock is a macroblock F and the reference macroblock at the origin point is a macroblock O. FIG. 11A shows a case where the current macroblock F is located on the left side of the reference macroblock O and FIG. 11B shows a case where the current macroblock F is located on the right side of the reference macroblock O.

The current macroblock F is divided into four 8×8 blocks $F_1$ through $F_4$, and the reference macroblock O is divided into four 8×8 blocks $O_1$ through $O_4$. Predicted values of DC coefficients of the four blocks $F_1$ through $F_4$ included in the current macroblock F are determined as follows.

In FIG. 11A, according to a processing order of the blocks $F_1$ through $F_4$ included in the current macroblock F, predicted values of DC coefficients of the blocks $F_1$ through $F_4$ can be determined using a total of three methods.

(1) A first method in which DC coefficients are predicted sequentially for the block $F_2$, the block $F_4$, the block $F_1$, and then the block $F_3$.

The predicted value of the DC coefficient of the block $F_2$ is determined to be a DC coefficient of the block $O_1$. Next, the DC coefficient of the block $F_4$ is obtained using DC coefficients of the blocks $O_1$, $O_3$, and $F_2$. In other words, when a difference between the DC coefficient of the block $O_1$ and the DC coefficient of the block $F_2$ is less than a difference between the DC coefficient of the block $O_1$ and the DC coefficient of the block $O_3$, there is a high probability that the DC coefficient of the block $F_4$ is similar to that of the block $O_3$. Therefore, the DC coefficient of the block $O_3$ is determined to be the DC coefficient of the block $F_4$.

The predicted value of the DC coefficient of the block $F_1$ is determined to the DC coefficient of the block $F_2$. The predicted value of the DC coefficient of the block $F_3$ is obtained using DC coefficients of the blocks $F_2$, $F_4$, and $F_1$. In other words, when a difference between the DC coefficient of the block $F_2$ and the DC coefficient of the block $F_1$ is less than a difference between the DC coefficient of the block $F_2$ and the DC coefficient of the block $F_4$, there is a high probability that the DC coefficient of the block $F_3$ is similar to that of the block $F_4$. Therefore, the DC coefficient of the block $F_4$ is determined to be the DC coefficient of the block $F_3$. In the contrary case, the DC coefficient of the block $F_1$ is determined to be the DC coefficient of the block $F_3$.

(2) A second method in which DC coefficients are predicted sequentially for the block $F_2$, the block $F_4$, the block $F_3$, and then the block $F_1$.

A method of determining predicted values of the DC coefficients of the blocks $F_2$ and $F_4$ is similar to that in the first method.

A predicted value of the DC coefficient of the block $F_3$ is determined to be the DC coefficient of the block $F_4$. A predicted value of the DC coefficient of the block $F_1$ is obtained using DC coefficients of the blocks $F_2$, $F_3$, and $F_4$. In other words, when a difference between the DC coefficient of the block $F_3$ and the DC coefficient of the block $F_4$ is less than a difference between the DC coefficient of the block $F_2$ and the DC coefficient of the block $F_4$, there is a high probability that the DC coefficient of the block $F_1$ is similar to that of the block $F_2$. Therefore, the DC coefficient of the block $F_2$ is determined to be the predicted value of the DC coefficient of the block $F_1$. In the contrary case, the DC coefficient of the block $F_3$ is determined to be the predicted value of the DC coefficient of the block $F_1$.

(3) A third method in which DC coefficients are predicted sequentially for the block $F_2$, the block $F_1$, the block $F_4$, and then the block $F_3$.

The DC coefficients can be predicted sequentially for the blocks $F_2$, $F_1$, $F_4$, and $F_3$ in the same manner as in the first and second methods, but in this method, information of reference blocks cannot be sufficiently used when compared to the first and second cases where the DC coefficients of the blocks $F_2$ and $F_4$ that are most adjacent to the macroblock O at the origin point are preferentially predicted.

Figure 1:
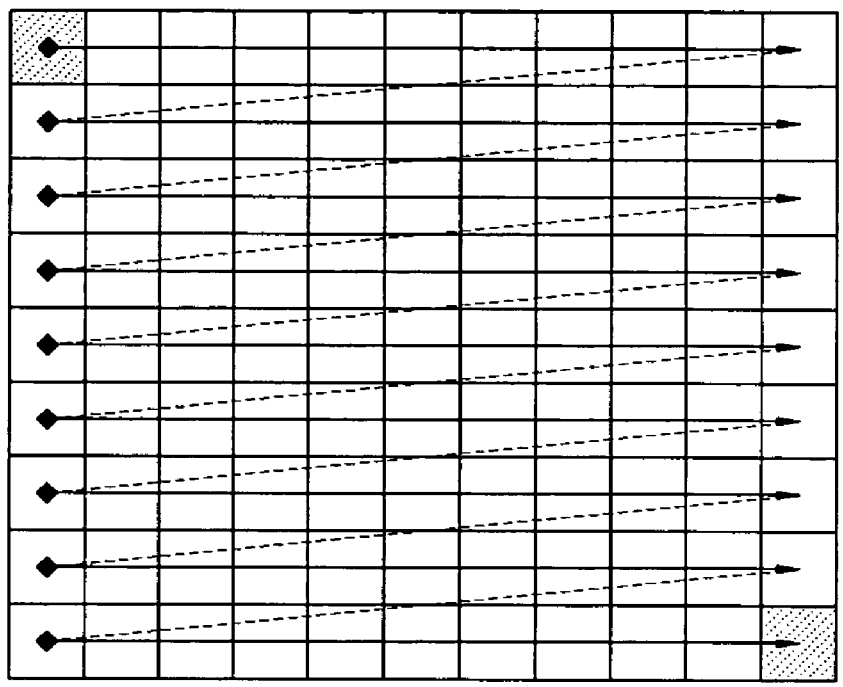
FIG. 1 shows conventional raster scan.
Figure 2:
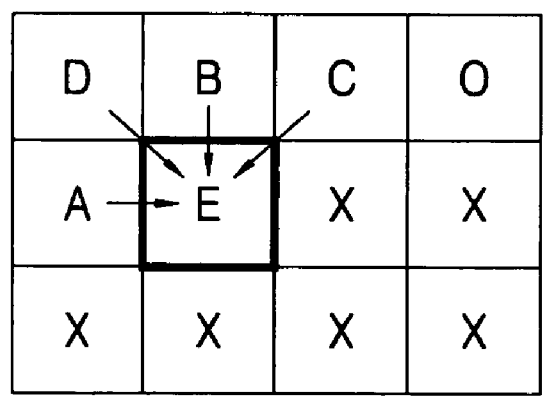
FIG. 2 shows an example of previous data units used for intra spatial predictive encoding of a current data unit according to prior art.
Figure 3:
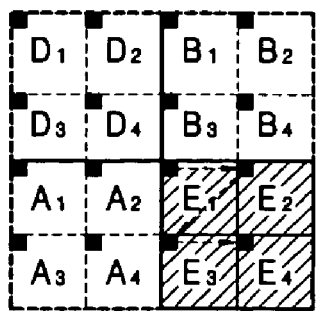
FIG. 3 is a view for explaining intra predictive encoding in MPEG-4 Part 2.
Figure 5:
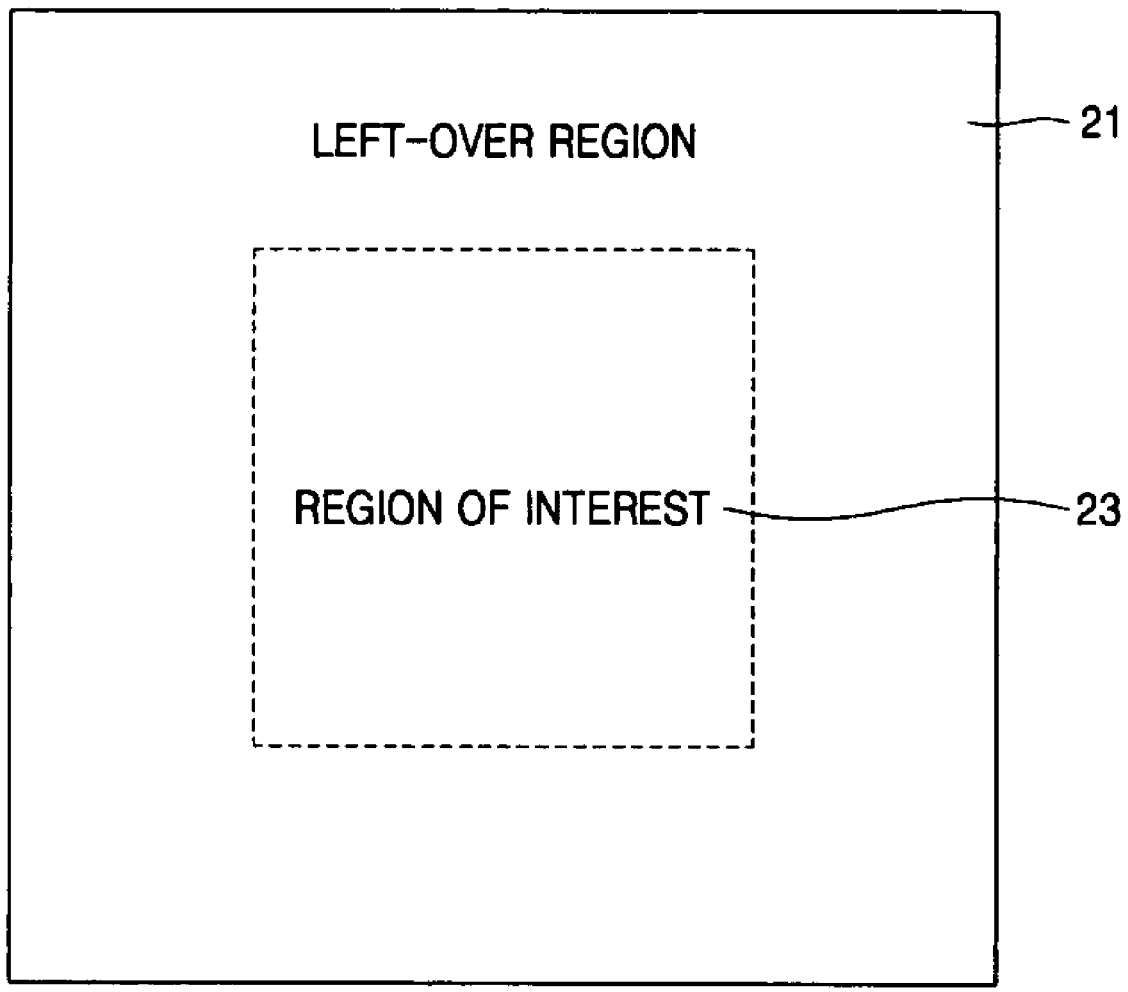
FIG. 5 shows a picture that is divided into a region of interest (ROI) and a left-over region.

The DC coefficients of the blocks $F_1$ through $F_4$ shown in FIG. 1B are predicted in the similar manner to prediction of the DC coefficients of the blocks $F_1$ through $F_4$ shown in FIG. 11A. In other words, a processing order of the blocks $F_1$ through $F_4$ is classified into a case where the DC coefficients are predicted sequentially for the block $F_1$, the block $F_3$, the block $F_2$, and then the block $F_4$, a case where the DC coefficients are predicted sequentially for the block $F_1$, the block $F_3$, the block $F_4$, and then the block $F_2$, and a case where the DC coefficients are predicted sequentially for the block $F_1$, the block $F_2$, the block $F_3$, and then the block $F_4$.

II. Case 2

FIGS. 12A through 12D show the current macroblock and the reference macroblock that correspond to case 2. Referring to FIGS. 12A through 12D, the current macroblock is a macroblock E and the reference macroblock is a macroblock A.

The current macroblock E is divided into four 8×8 blocks $E_1$ through $E_4$ and the reference macroblock A is divided into four 8×8 blocks $A_1$ through $A_4$.

Figure 12A:
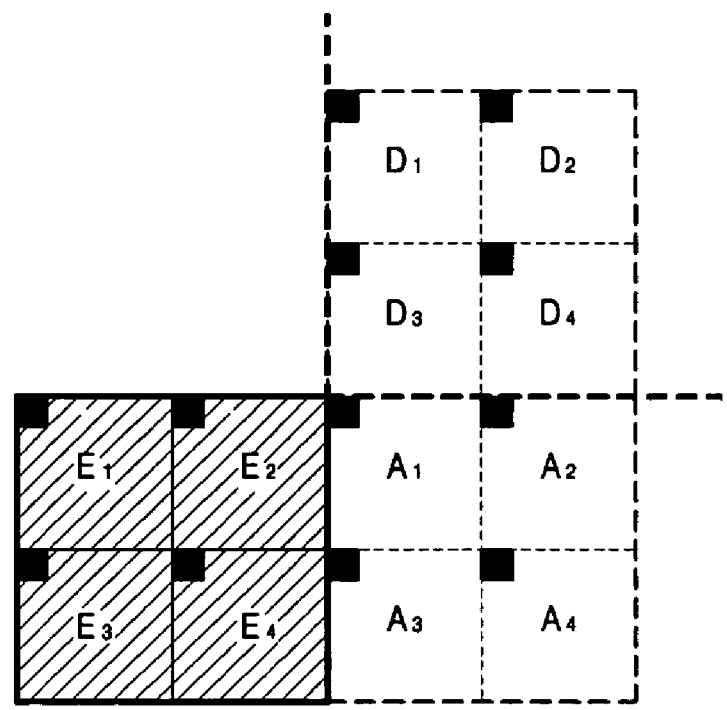
FIGS. 12A through 12D show a current macroblock and reference macroblocks according to another exemplary embodiment of the present invention.
Figure 12B:
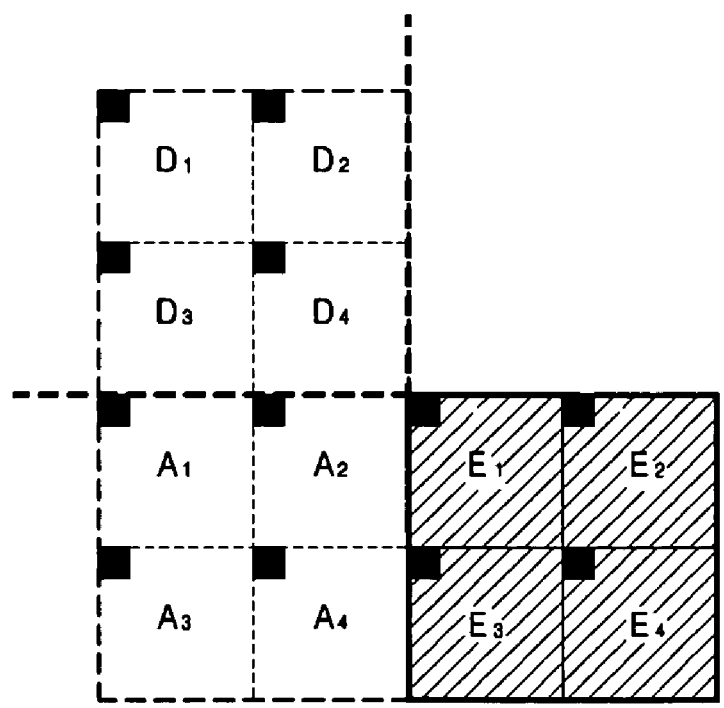

The predicted values of the DC coefficients of the four blocks E1 through E4 included in the current macroblock E are determined as follows. The predicted values of the DC coefficients of the blocks $E_1$ through $E_4$ shown in FIG. 12A are determined in the same manner as determination of the predicted values of the DC coefficients of the blocks $F_1$ through $F_4$ shown in FIG. 11A. The predicted values of the DC coefficients of the blocks $E_1$ through $E_4$ shown in FIG. 12B are determined in the same manner as determination of the predicted values of the DC coefficients of the blocks $F_1$ through $F_4$ shown in FIG. 11B.

Figure 12C:
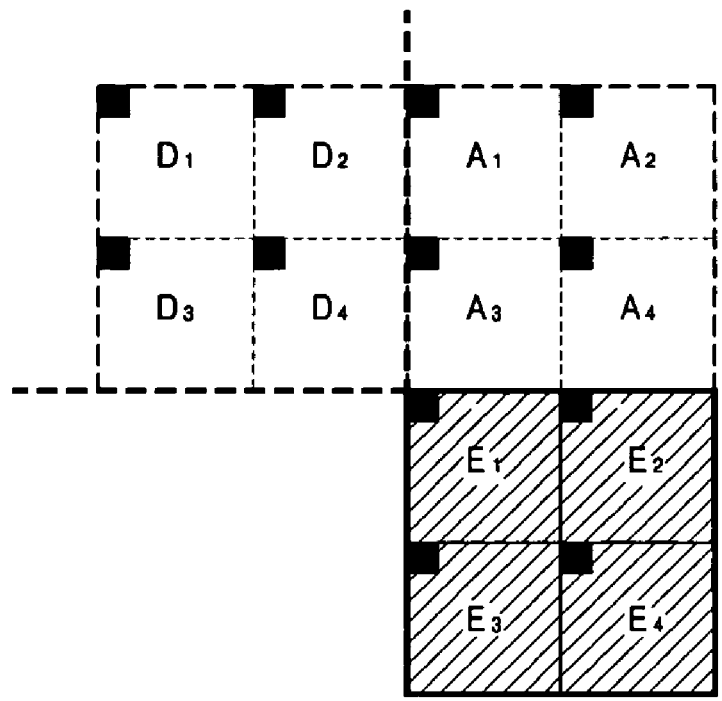
Figure 12D:
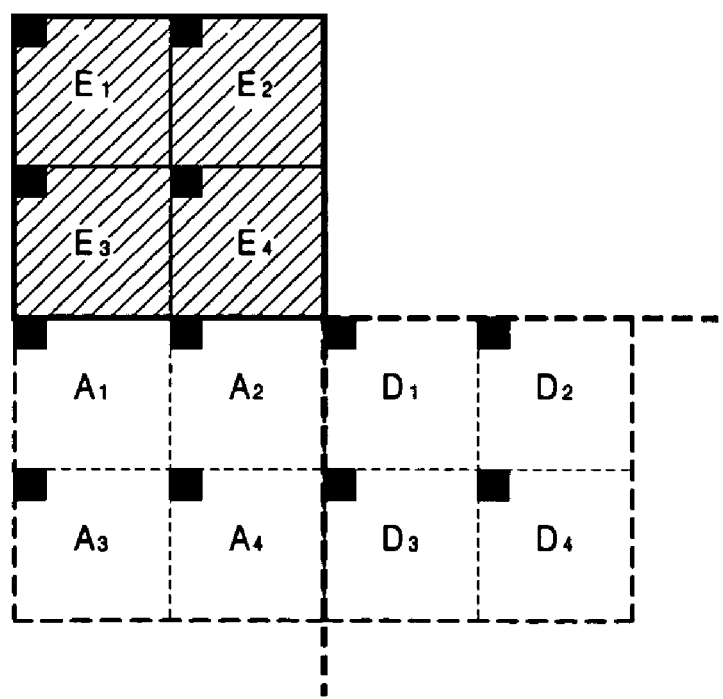
Figure 13A:
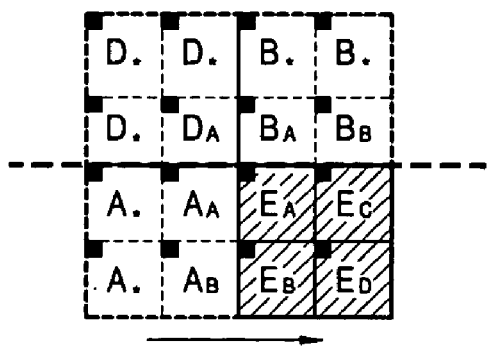
FIGS. 13A through 13H show a current macroblock and reference macroblocks according to still another exemplary embodiment of the present invention.
Figure 13B:
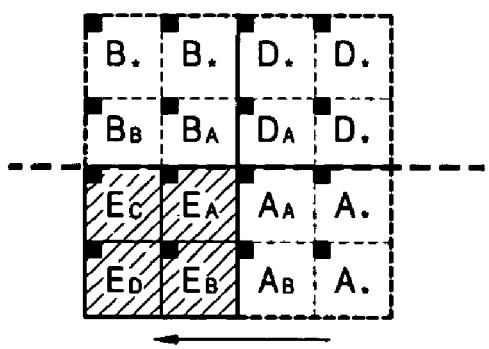
Figure 13C:
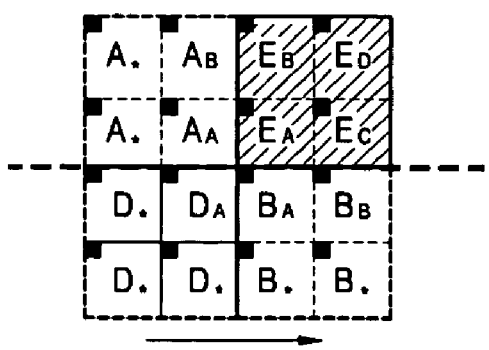
Figure 13D:
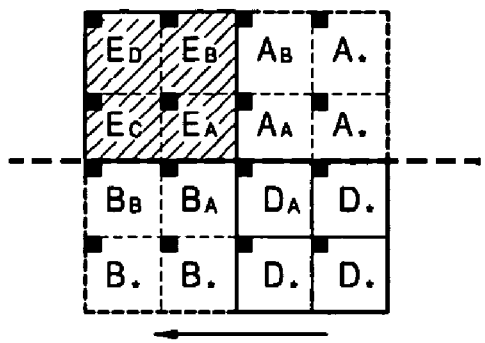
Figure 13E:
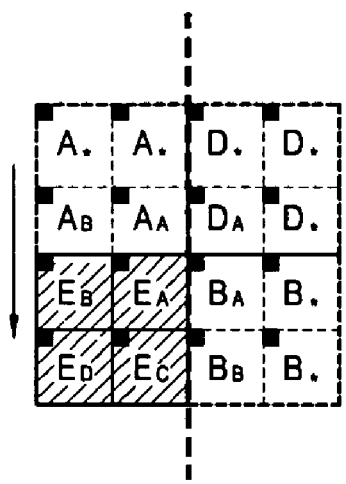
Figure 13F:
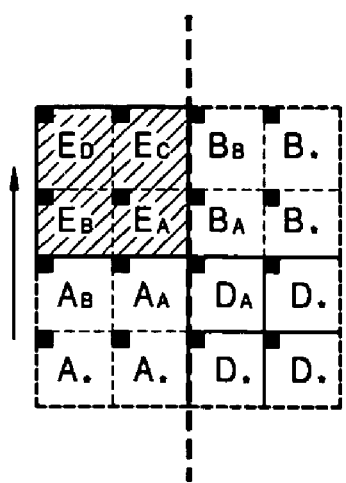
Figure 13G:
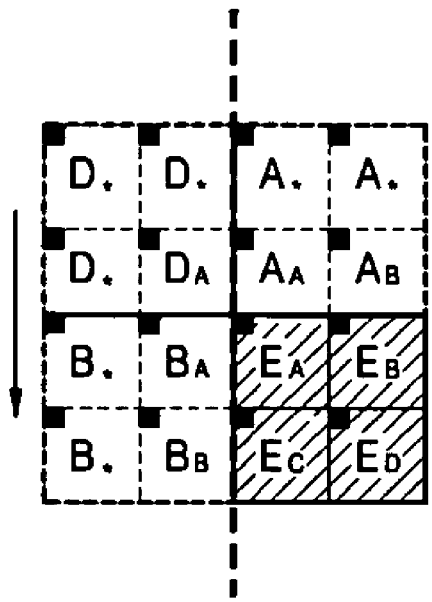
Figure 13H:
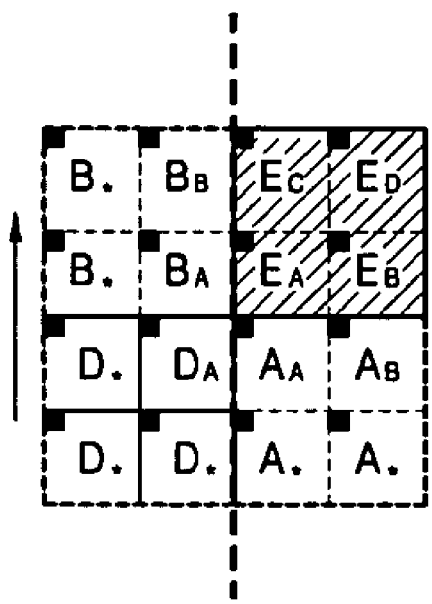

The predicted values of the DC coefficients of the blocks $E_1$ through $E_4$ shown in FIGS. 12C and 12D are also determined in the same manner as determination of the predicted values of the DC coefficients of the blocks $F_1$ through $F_4$ shown in FIGS. 11A and 11B. As an example, prediction of the DC coefficients of the blocks $E_1$ through $E_4$ shown in FIG. 12C will be described.

The predicted values of the DC coefficients of the blocks $E_1$ through $E_4$ shown in FIG. 12C can be determined using a total of three methods according to a processing order of the blocks $E_1$ through $E_4$.

(1) A first method in which DC coefficients are predicted sequentially for the block $E_1$, the block $E_2$, the block $E_3$, and then the block $E_4$.

The predicted value of the DC coefficient of the block $E_1$ is determined to be the DC coefficient of the block $A_3$. Next, the predicted value of the DC coefficient of the block $E_2$ is obtained using the DC coefficients of the blocks $A_3$, $A_4$, and $E_1$. In other words, if a difference between the DC coefficient of the block $A_3$ and the DC coefficient of the block $A_4$ is less than a difference between the DC coefficient of the block $A_3$ and the DC coefficient of the block $E_1$, there is a high probability that the DC coefficient of the block $E_2$ is similar to that of the block $E_1$. Thus, the DC coefficient of the block $E_1$ is determined to be the predicted value of the DC coefficient of the block $E_2$. In the contrary case, the DC coefficient of the block $A_4$ is determined to be the predicted value of the DC coefficient of the block $E_2$.

The predicted value of the DC coefficient of the block $E_3$ is determined to be the DC coefficient of the block $E_1$. The predicted value of the DC coefficient of the block $E_4$ is obtained using the DC coefficients of the blocks $E_1$, $E_2$, and $E_3$. In other words, if a difference between the DC coefficient of the block $E_1$ and the DC coefficient of the block $E_2$ is less than a difference between the DC coefficient of the block $E_1$ and the DC coefficient of the block $E_3$, there is a high probability that the DC coefficient of the block $E_4$ is similar to that of the block $E_3$. Thus, the DC coefficient of the block $E_3$ is determined to be the predicted value of the DC coefficient of the block $E_4$. In the contrary case, the DC coefficient of the block $E_2$ is determined to be the predicted value of the DC coefficient of the block $E_4$.

The methods in which the DC coefficients are predicted sequentially for the block $E_1$, the block $E_2$, the block $E_4$, and then $E_3$ and sequentially for the block $E_1$, the block $E_3$, the block $E_2$, and then $E_4$ will not be described.

III. Case 3

FIGS. 13A through 13H show the current macroblock and the reference macroblocks that correspond to case 3. Referring to FIGS. 13A through 13H, the current macroblock is a macroblock E and the reference macroblocks are a macroblock A, a macroblock B, and a macroblock D. The current macroblock E is divided into four 8×8 blocks $E_A$ through $E_D$, the reference macroblock A is divided into four 8×8 blocks $A_A$ through $A_D$, the reference macroblock B is divided into four 8×8 blocks $B_A$ through $B_D$, and the reference macroblock D is divided into four 8×8 blocks $D_A$ through $D_D$.

If DC coefficients are predicted sequentially for the block $E_A$, the block $E_B$, the block $E_C$, and then the block $E_D$ included in the current macroblock E shown in FIGS. 13A through 13H, there always exist reference blocks that are adjacent to the current macroblock E horizontally, vertically, and diagonally for prediction of the DC coefficients of the blocks $E_A$ through $E_D$. Therefore, the predicted value of the DC coefficient of the current block can be determined by comparing DC coefficients of the adjacent 8×8 reference blocks.

The method of predicting a DC coefficient described above is carried out in the same manner in an encoder and a decoder.

As described above, according to the present invention, even when video data is scanned according to ROI-oriented scanning and then encoded and decoded, intra-prediction of video data can be used, resulting in improvement of the encoding efficiency of video data.

The present invention can also be embodied as a computer readable code on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of predicting a direct current (DC) coefficient of a video data unit, the method comprising:

selecting at least one reference data unit for prediction of a DC coefficient of a current data unit from at least one previous data unit that is scanned according to region of interest-oriented scanning and then transformed before the current data unit, wherein in the region of interest-oriented scanning, scanning starts with a data unit located in a predetermined location of a region of interest and continues in the form of a plurality of square rings in which the remaining data units included in the region of interest surround the data unit located in the predetermined location of the region of interest; and determining, using a processor, a predicted value of the DC coefficient of the current data unit using a DC coefficient of the at least one reference data unit, wherein in the selecting of the at least one reference data unit, among previous data units included in a current square ring including the current data unit and previous data units included in a previous square ring, a previous data unit that is adjacent to the current data unit is selected as the at least one reference data unit, wherein for every current data unit, if one of the previous data units included in the current square ring is horizontally or vertically adjacent to the current data unit, one of the previous data units included in the previous square ring is diagonally adjacent to the current data unit, and there exists no previous data unit in the previous square ring which is horizontally or vertically adjacent to the current data unit, only the previous data unit in the current square ring is selected as the at least one reference data unit.

2. The method of claim 1, wherein if a first previous data unit that is adjacent to the current data unit exists as one of the previous data units included in the current square ring, a second previous data unit that is adjacent to the current data unit exists as one of the previous data units included in the previous square ring, and a third previous data unit that is adjacent to both the first previous data unit and the second previous data unit exists, the first previous data unit, the second previous data unit, and the third previous data unit are selected as reference data units.

3. The method of claim 1, wherein in the selection of the at least one reference data unit, if the data unit located in the predetermined location only exists as one of the previous data units, the data unit located in the predetermined location is selected as the at least one reference data unit.

4. The method of claim 1, wherein the determining the predicted value of the DC coefficient of the current data unit comprises:

dividing the current data unit into a plurality of sub-data units; and determining a predicted value of a DC coefficient of at least one of the sub-data units using at least one of DC coefficients of a plurality of sub-reference data units included in the at least one reference data unit and DC coefficients of encoded or decoded sub-data units.

5. The method of claim 4, wherein in the determining of the predicted value of the DC coefficient of the at least one of the sub-data units, if there exists a first sub-data unit, from among the sub-reference data units and the encoded or decoded sub-data units, that is horizontally adjacent to the at least one of the sub-data units, a second sub-data unit, from among the sub-reference data units and the encoded or decoded sub-data units, that is vertically adjacent to the at least one of the sub-data units, and a third sub-data unit, from among the sub-reference data units and the encoded or decoded sub-data units, that is diagonally adjacent to the at least one of the sub-data units, the predicted value of the DC coefficient the at least one of the sub-data units is determined according to a similarity between the first sub-data unit and the third sub-data unit and a similarity between the second sub-data unit and the third sub-data unit.

6. The method of claim 4, wherein in determining of the predicted value of the DC coefficient of the at least one of the sub-data units, when there exists a first sub-data unit, from among the sub-reference data units and the encoded or decoded sub-data units, that is horizontally adjacent to the at least one of the sub-data units, a second sub-data unit, from among the sub-reference data units and the encoded or decoded sub-data units, that is vertically adjacent to the at least one of the sub-data units, and a third sub-data unit, from among the sub-reference data units and the encoded or decoded sub-data units, that is diagonally adjacent to the at least one of the sub-data units, if a difference between a DC coefficient of the first sub-data unit and a DC coefficient of the third sub-data unit is less than a difference between a DC coefficient of the second sub-data unit and the DC coefficient of the third sub-data unit, the DC coefficient of the second sub-data unit is determined to be the predicted value of the DC coefficient of at least one of the sub-data units.

7. The method of claim 4, wherein in the determination of the predicted value of the DC coefficient of each of the sub-data units, if there does not exist one of a first sub-data unit, from among the sub-reference data units and the encoded or decoded sub-data units, that is horizontally adjacent to the at least one of the sub-data units, a second sub-data unit, from among the sub-reference data units and the encoded or decoded sub-data units, that is vertically adjacent to the at least one of the sub-data units, and a third sub-data unit, from among the sub-reference data units and the encoded or decoded sub-data units, that is diagonally adjacent to the at least one of the sub-data units, one of the DC coefficient of the first sub-data unit and the DC coefficient of the second sub-data unit is determined to be the predicted value of the DC coefficient of at least one of the sub-data units.

8. The method of claim 4, wherein the current data unit and the at least one reference data unit are 16×16 blocks, and the sub-data units and the sub-reference data units are 8×8 blocks.

9. An apparatus for predicting a direct current (DC) coefficient of a video data unit, the apparatus comprising:
a memory which stores a transform coefficient of at least one previous data unit that is scanned according to region of interest-oriented scanning and then transformed before the current data unit, wherein in the region of interest-oriented scanning, scanning starts with a data unit located in a predetermined location of a region of interest and continues in the form of a plurality of square rings in which the remaining data units included in the region of interest surround the data unit located in the predetermined location of the region of interest;
a reference data unit selection unit which selects at least one reference data unit for prediction of a DC coefficient of the current data unit from among the at least one previous data unit; and
a prediction unit which receives an index indicating the selected at least one reference data unit from the reference data unit selection unit, reads a DC coefficient of the selected at least one reference data unit from the memory, and determines a predicted value of the DC coefficient of the current data unit using the read DC coefficient of the at least one reference data unit
wherein among previous data units included in a current square ring including the current data unit and previous data units included in a previous square ring, the reference data unit selection unit selects a previous data unit that is adjacent to the current data unit as the at least one reference data unit,
wherein for every current data unit, if one of the previous data units included in the current square ring is horizontally or vertically adjacent to the current data unit, one of the previous data units included in the previous square ring is diagonally adjacent to the current data unit, and there exists no previous data unit in the previous square ring which is horizontally or vertically adjacent to the current data unit, only the previous data unit in the current square ring is selected as the at least one reference data unit.

10. The apparatus of claim 9, wherein if a first previous data unit that is adjacent to the current data unit exists as one of the previous data units included in the current square ring, a second previous data unit that is adjacent to the current data unit exists as one of the previous data units included in the previous square ring, and a third previous data unit that is adjacent to both the first previous data unit and the second previous data unit exists, the reference data unit selection unit selects the first previous data unit, the second previous data unit, and the third previous data unit as reference data units.

11. The apparatus of claim 9, wherein the reference data unit selection unit selects the data unit located in the predetermined location as the at least one reference data unit if the data unit located in the predetermined location only exists as one of the previous data units.

12. The apparatus of claim 9, wherein the prediction unit divides the current data unit into a plurality of sub-data units and determines a predicted value of a DC coefficient of at least one of the sub-data units using at least one of DC coefficients of a plurality of sub-reference data units included in the at least one reference data unit and DC coefficients of encoded or decoded sub-data units.

13. The apparatus of claim 12, wherein if there exists a first sub-data unit, from among the sub-reference data units and the encoded or decoded sub-data units, that is horizontally adjacent to the at least one of the sub-data units, a second sub-data unit, from among the sub-reference data units and the encoded or decoded sub-data units, that is vertically adjacent to the at least one of the sub-data units, and a third sub-data unit, from among the sub-reference data units and the encoded or decoded sub-data units, that is diagonally adjacent to the at least one of the sub-data units, the prediction unit determines the predicted value of the DC coefficient the at least one of the sub-data units according to a similarity between the first sub-data unit and the third sub-data unit and a similarity between the second sub-data unit and the third sub-data unit.

14. The apparatus of claim 12, wherein if there exists a first sub-data unit, from among the sub-reference data units and the encoded or decoded sub-data units, that is horizontally adjacent to the at least one of the sub-data units, a second sub-data unit, from among the sub-reference data units and the encoded or decoded sub-data units, that is vertically adjacent to the at least one of the sub-data units, and a third sub-data unit, from among the sub-reference data units and the encoded or decoded sub-data units, that is diagonally adjacent to the at least one of the sub-data units, if a difference between a DC coefficient of the first sub-data unit and a DC coefficient of the third sub-data unit is less than a difference between a DC coefficient of the second sub-data unit and the DC coefficient of the third sub-data unit, the prediction unit determines the DC coefficient of the second sub-data unit to be the predicted value of the DC coefficient of at least one of the sub-data units.

15. The apparatus of claim 12, wherein if there does not exist one of a first sub-data unit, from among the sub-reference data units and the encoded or decoded sub-data units, that is horizontally adjacent to the at least one of the sub-data units, a second sub-data unit, from among the sub-reference data units and the encoded or decoded sub-data units, that is vertically adjacent to the at least one of the sub-data units, and a third sub-data unit, from among the sub-reference data units and the encoded or decoded sub-data units, that is diagonally adjacent to the at least one of the sub-data units, the prediction unit determines one of the DC coefficient of the first sub-data unit and the DC coefficient of the second sub-data unit to be the predicted value of the DC coefficient of at least one of the sub-data units.

16. The apparatus of claim 12, wherein the current data unit and the reference data unit are 16×16 blocks, and the sub-data units and the sub-reference data units are 8×8 blocks.

17. A non-transitory computer-readable recording medium having recorded thereon a program for implementing a method of predicting a direct current (DC) coefficient of a video data unit, the method comprising:
selecting at least one reference data unit for prediction of a DC coefficient of a current data unit from at least one previous data unit that is scanned according to region of interest-oriented scanning and then transformed before the current data unit, wherein in the region of interest-oriented scanning, scanning starts with a data unit located in a predetermined location of a region of interest and continues in the form of a plurality of square rings in which the remaining data units included in the region of interest surround the data unit located in the predetermined location of the region of interest; and determining a predicted value of the DC coefficient of the current data unit using a DC coefficient of the at least one reference data unit, wherein in the selecting of the at least one reference data unit, among previous data units included in a current square ring including the current data unit and previous data units included in a previous square ring, a previous data unit that is adjacent to the current data unit is selected as the at least one reference data unit, wherein for every current data unit, if one of the previous data units included in the current square ring is horizontally or vertically adjacent to the current data unit, one of the previous data units included in the previous square ring is diagonally adjacent to the current data unit, and there exists no previous data unit in the previous square ring which is horizontally or vertically adjacent to the current data unit, only the previous data unit in the current square ring is selected as the at least one reference data unit.

* * * * *